(12) United States Patent
Sousa et al.

(10) Patent No.: US 10,411,506 B2
(45) Date of Patent: Sep. 10, 2019

(54) QUALITY OF CHARGE DETECTOR FOR USE IN INDUCTIVE CHARGING SYSTEMS

(71) Applicant: Active-Semi, Inc., Road Town, Tortola (VG)

(72) Inventors: Marc Sousa, McKinney, TX (US); Mark Cieri, Flower Mount, TX (US)

(73) Assignee: Active-Semi, Inc. (VG)

( * ) Notice: Subject to any disclaimer, the term of this patent is extended or adjusted under 35 U.S.C. 154(b) by 1506 days.

(21) Appl. No.: 14/263,689

(22) Filed: Apr. 28, 2014

(65) Prior Publication Data

US 2015/0310722 A1    Oct. 29, 2015

(51) Int. Cl.
| | | |
|---|---|---|
| *H01F 38/00* | (2006.01) | |
| *H02J 50/10* | (2016.01) | |
| *H02J 50/90* | (2016.01) | |
| *H02J 50/40* | (2016.01) | |
| *H02J 50/12* | (2016.01) | |
| *H02J 50/80* | (2016.01) | |
| *H02J 7/02* | (2016.01) | |

(52) U.S. Cl.
CPC .............. *H02J 50/10* (2016.02); *H02J 7/025* (2013.01); *H02J 50/12* (2016.02); *H02J 50/40* (2016.02); *H02J 50/80* (2016.02); *H02J 50/90* (2016.02)

(58) Field of Classification Search
None
See application file for complete search history.

(56) References Cited

U.S. PATENT DOCUMENTS

| | | | | |
|---|---|---|---|---|
| 8,482,158 | B2 * | 7/2013 | Kurs .................... | H01Q 1/248 307/104 |
| 2009/0096413 | A1 * | 4/2009 | Partovi ................. | H01F 5/003 320/108 |
| 2009/0174263 | A1 * | 7/2009 | Baarman ............ | H02M 3/33523 307/104 |
| 2011/0156640 | A1 * | 6/2011 | Moshfeghi ............ | H02J 50/20 320/108 |
| 2012/0242159 | A1 * | 9/2012 | Lou ....................... | H03H 7/40 307/104 |
| 2014/0184150 | A1 * | 7/2014 | Walley .................. | H02J 5/005 320/108 |
| 2014/0339905 | A1 * | 11/2014 | Moritsuka ............. | H02J 5/005 307/104 |
| 2015/0171633 | A1 * | 6/2015 | Nakano ................. | H02J 50/12 307/104 |

(Continued)

OTHER PUBLICATIONS

System Description Wireless Power Transfer, vol. 1 Low Power, Part 1: Interface Description, Version 1.1.2, Wireless Power Consortium, Jun. 2013.

*Primary Examiner* — Lincoln D Donovan
*Assistant Examiner* — Khareem E Almo
(74) *Attorney, Agent, or Firm* — Imperium Patent Works; Daniel D. Tagliaferri; Amir V. Adibi (57) ABSTRACT

A quality of charge (QoC) detector for use in inductive charging systems is disclosed. In an exemplary embodiment, an apparatus includes an inductor that receives a current signal to generate an electromagnetic field during a power transfer to an external device, and a quality detector to determine a quality metric associated with the power transfer. The apparatus also includes an indicator that indicates multiple states, where one of the multiple states is selected to indicate the quality metric.

20 Claims, 9 Drawing Sheets

(56) References Cited

U.S. PATENT DOCUMENTS

| | | | | |
|---|---|---|---|---|
| 2015/0310722 A1* | 10/2015 | Sousa | ................... | H02J 50/12 |
| | | | | 307/104 |
| 2016/0126752 A1* | 5/2016 | Vuori | .................. | H02J 7/04 |
| | | | | 307/104 |
| 2017/0040831 A1* | 2/2017 | Desai | .................... | H02J 7/025 |
| 2017/0077742 A1* | 3/2017 | Moshfeghi | ............. | H02J 50/20 |

* cited by examiner

QUALITY OF CHARGE DETECTOR FOR USE IN INDUCTIVE CHARGING SYSTEMS

TECHNICAL FIELD

The present application relates generally to the operation and design of inductive charging systems, and more particularly, to the operation and design of a quality of charge detector for use in inductive charging systems.

BACKGROUND INFORMATION

Inductive charging (also known as "wireless charging") uses an electromagnetic field to transfer energy between two devices. For example, energy may be sent from a charging station through an inductive coupling to a portable device, which can then use that energy to charge batteries or operate the device. Inductive charging can be used to charge batteries in small devices like mobile phones or in larger devices like electric vehicles.

An inductive charger typically utilizes a primary inductor or coil to create an alternating electromagnetic field from within a charging base station. A device with a secondary inductor or coil is positioned close to the charging base station so that the field generated by the primary inductor couples to the secondary inductor. Thus, the secondary inductor experiences changing field strengths (or signal strengths) as it is moved farther or closer to the primary inductor. The secondary inductor takes power from the electromagnetic field based on the received signal strength and converts it back into electrical current that can be used to charge a battery. Since there is no direct or wired connection in an induction charging system, the electronics may be sealed for protection from the elements and durability is improved since there is no need to plug and unplug electrical connectors.

During a typical charging process, the user simply places the device to be charged on a charging surface of a charging station. The charging station detects the presence of the device and begins a charging process that includes determining device identification and configuration parameters. Once the configuration is completed, an energy transfer is performed through an inductive coupling until the device signals that battery charging has completed, or until the device is removed from the charging surface. A detailed description of an inductive charging system and its operation is disclosed in a document entitled "System Description Wireless Power Transfer" version 1.1.2 published by the Wireless Power Consortium in June 2013, the contents of which are incorporated by reference herein.

The rate of energy transfer can greatly affect the length of time necessary to charge a device's battery. The signal strength determined from the relative positions of the primary and secondary inductors determines the overall rate of energy transfer. A quality of charge (QoC) metric can be determined that characterizes the overall power transfer from the charging station to the charge receiving device. A higher QoC metric indicates higher efficiency that will result in shorter battery charge time and a lower QoC metric indicates lower efficiency that results in longer battery charge time.

In practice, this means that a device's placement on a charging surface relative to the primary inductor affects the signal strength experienced by the charging device and therefore the QoC metric. It is desirable to place a device on the charging surface such that the highest or optimum QoC metric is achieved so that battery charge times can be reduced or minimized.

Conventional systems may provide only a simple on/off indicator to indicate whether or not a device's battery is charging. Unfortunately, an on/off charging indicator provides no information to the user about the QoC. As a result, a device user may not know anything about the rate of energy transfer to the receiving device or the overall battery charge time.

Therefore, it would be desirable to have a mechanism that quickly determines a QoC metric during induction charging, and provides notification of the QoC metric to a user to allow the user to reposition a charge receiving device on the charging surface to increase the QoC metric and thereby increase energy transfer and decrease or minimize battery charge time.

SUMMARY

A QoC detector for use in inductive charging systems is disclosed. In exemplary embodiments, the QoC detector operates to detect a QoC metric associated with an inductive power transfer between an inductive charging device and a receiving device. The QoC metric indicates energy transfer and is displayed to a device user. The device user can change the relative positions of the inductive charging device and the receiving device to increase the QoC metric and thereby increase the energy transfer. As a result, shorter battery charge times can be achieved.

In an exemplary embodiment an apparatus includes an inductor that receives a current signal to generate an electromagnetic field during a power transfer to an external device, and a quality detector to determine a quality metric associated with the power transfer. The apparatus also includes an indicator that indicates multiple states, where one of the multiple states is selected to indicate the quality metric.

In another exemplary embodiment, a method includes generating an electromagnetic field to perform a power transfer to an external device, and determining a quality metric associated with the power transfer. The method also includes indicating the quality metric on an indicator that indicates multiple states, wherein one of the multiple states indicates the quality metric.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate exemplary embodiments of the invention.

DETAILED DESCRIPTION

The detailed description set forth below in connection with the appended drawings is intended as a description of exemplary embodiments of the invention and is not intended to represent the only embodiments in which the invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Figure 1:
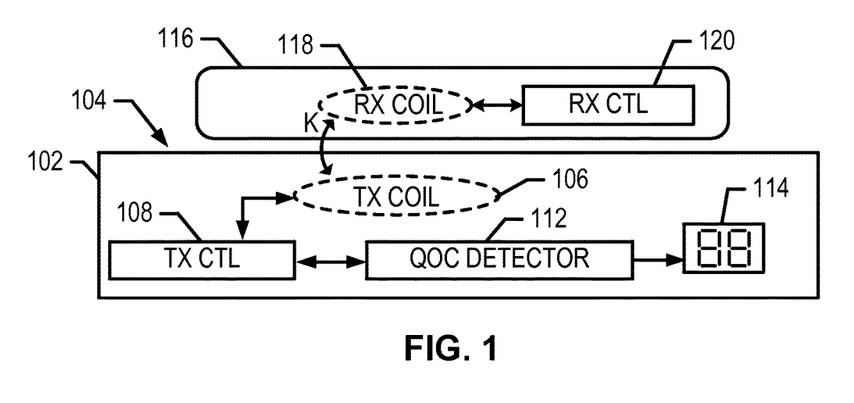
FIG. 1 shows an inductive charging device that includes an exemplary embodiment of a QoC detector.

FIG. 1 shows an inductive charging device 102 that includes an exemplary embodiment of a QoC detector 112. The inductive charging device 102 may also be referred to as an inductive charger, charging tablet or charging pad. The device 102 includes a charging surface 104 onto which a charge receiving (Rx) device 116 may be placed to receive energy through an inductive coupling formed between the device 102 and the charge receiving device 116. The charge receiving device 116 may be a mobile phone, pager, smartphone, or any other type of battery powered device.

The device 102 includes a transmit (Tx) controller 108, a Tx inductor or coil 106 connected to the Tx controller 108, and a QoC detector 112. The QoC detector 112 operates to determine a QoC metric related to the energy transfer between the Tx controller 108 and a Rx receiver 116. The QoC detector 112 outputs a detected QoC metric to a multistate indicator 114 (e.g. digital display) that indicates the QoC metric to a device user.

During operation, the receiving device 116 is placed on the charging surface 104 such that the Tx coil 106 and the Rx coil 118 align to form an inductive coupling (K) that allows energy to be transferred from the Tx coil 106 to the Rx coil 118. For example, the Tx controller 108 energizes the Tx coil 106 to generate an electromagnetic field that inductively couples to the Rx coil 118. The relative positions of the two coils determine the signal strength experienced by the Rx coil 118. The Rx controller 120 uses the energy received by the Rx Coil 118 to charge local batteries or simply to operate the receiving device 116. The Rx controller 120 also sends messages back to the Tx controller 108 through the inductive coupling. Some of these messages indicate the received signal strength or other values associated with the energy transfer determined by the Rx controller 120. The Tx controller 108 receives the messages from the Rx controller 120 and passes the received information along with other parameters to the QoC detector 112.

The QoC detector 112 performs an algorithm using the received information to determine a QoC metric that describes the energy transfer between the Tx controller 108 and a Rx receiver 116. The QoC detector 112 then outputs the QoC metric to the indicator 114, which is viewable by a user.

The relative positions of the Tx coil 106 and the Rx coil 118 affect the QoC metric. Thus, by moving the receiving device 116 around the charging surface 104, the relative positions of the Tx coil 106 and the Rx coil 118 are changed, and as a result, so is the QoC metric.

The QoC detector 112 determines the QoC metric at various intervals or specific times as the receiving device 116 is moved and displays the QoC metric values on the indicator 114. Accordingly, a user is able to move or reposition the charge receiving device 116 on the charging surface 104 until the largest or optimum QoC metric is obtained as indicated by the indicator 114. A higher QoC metric indicates greater energy transfer to the device 116. Once the receiving device 116 is positioned to obtain the largest or optimum QoC metric, the shortest battery charge times can be obtained. It should also be noted that the exemplary embodiments of the QoC detector 112 are suitable for use with inductive chargers utilizing resonant inductive coupling. A more detailed description of the QoC detector 112 is provided below.

Figure 2:
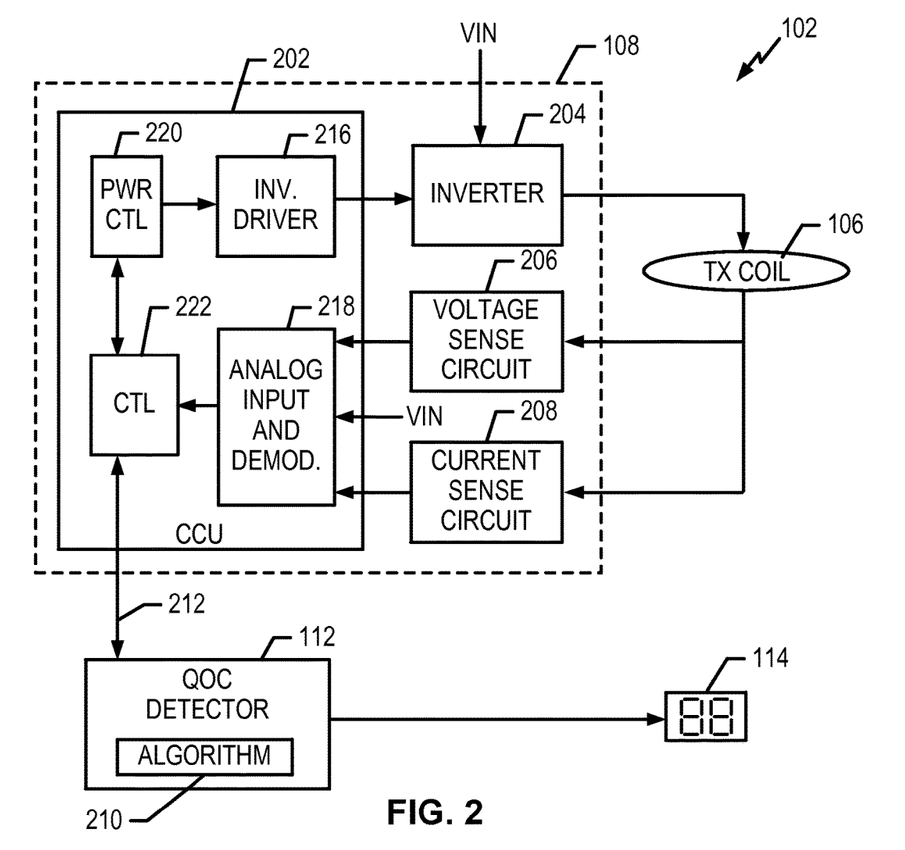
FIG. 2 shows a detailed exemplary embodiment of the inductive charging device shown in FIG. 1.

FIG. 2 shows a detailed exemplary embodiment of the charging device 102 shown in FIG. 1. The Tx controller 108 includes a control and communication unit (CCU) 202, inverter 204, voltage sense circuit 206, and current sense circuit 208. The inverter 204 provides power to the Tx coil 106 under the control of the CCU 202. For example, the CCU 202 includes an inverter driver 216 that outputs a drive signal to control the operation of the inverter 204. The voltage sense circuit 206 and the current sense circuit 208 operate to sense the voltage and current associated with the Tx coil 106 and provide feedback to the CCU 202. For example, the CCU 202 includes an analog input and demodulator 218 that receives the voltage and current sense signals and any other desired analog signals, such as the input voltage (Vin). The analog input and demodulator 218 operates to digitize the analog signals for input to a controller 222. The analog input and demodulator 218 also demodulates the current and voltage sense signals to extract messages sent from a charge receiving device through the inductive coupling. These messages also are passed from the demodulator 218 to the controller 222.

The controller 222 operates to decode the messages received from the demodulator 218 and pass information from the messages to a power controller 220. The power controller 220 operates to control the operation of the inverter driver 216. For example, a charge receiving device may send a message to the Tx controller 108 through the inductive coupling, which appears as modulation of voltage and current sense signals associated with the Tx coil 106. The sense circuits 206 and 208 provide these modulated signals to the demodulator 218. The demodulator extracts the message from the modulated signals and passes the message to the controller 222. The message may include a request for an increase/decrease in power to the Tx coil 106. The controller 222 passes the message and/or other instructions to the power controller 220, which controls the inverter driver 216 to provide the power increase/decrease from the inverter 204 to the Tx coil 106.

During operation, the CCU 202 controls the inverter 204 to drive the Tx coil 106 at predetermined power levels. For example, the CCU 202 operates to perform an inductive power transfer between the Tx coil 106 and the Rx coil 118 in four operating phases. In a selection phase, the CCU 202 detects the presence of a receiving device on the charging pad. In a ping phase, the CCU 202 controls the inverter 204 to output a ping signal to the Tx coil 106 at a predetermined power level to establish an inductive coupling with the charge receiving device.

In a configuration phase, the charge receiving device sends messages back through the inductive coupling that indicate received signal strength and configuration parameters.

In a power transfer phase, the CCU 202 controls the inverter 204 to adjust the power of the signal sent to the Tx coil 106 based on messages received from the Rx controller. For example, the Rx controller sends messages to the Tx controller 108 to increase or decrease the power level at the Tx coil 106. The Rx controller also sends messages to the Tx controller 108 that indicate the currently received power level at the charge receiving device. During at least two of the four operating phases, the CCU 202 receives messages indicating the power received at the receiving device. This information is combined with parameters known by the CCU 202, such as Vin, current and voltage sense signals, and other parameters associated with the operation of the Tx controller 108. The combined information and parameters are then passed to the QoC detector 112 through signal path 212.

The QoC detector 112 receives the parameters from the CCU 202 that include various analog signals, such as the input voltage (Vin) and the sense current and voltage. The QoC detector 112 operates to perform an algorithm 210 to determine the QoC metric associated with the energy transfer. The QoC metric is dependent on the relative positions of the coils 106 and 120. For example, in an exemplary embodiment, the algorithm determines the QoC metric as a ratio of the output power and input power associated with the energy transfer. A more detailed description of the algorithm 210 is provided below.

The QoC detector 112 converts the QoC metric to an QoC value and outputs the QoC value to the indicator 114. In an exemplary embodiment, the indicator 114 is capable of indicating multiple states. For example, in an exemplary embodiment, the indicator 114 is a two digit digital display that is capable of displaying 100 different states. In another embodiment, the indicator 114 is a group of LEDs capable of indicating multiple states where one or more LEDS are illuminated to represent a particular state based on the charging metric. For example, in one exemplary embodiment, the group includes five LEDs that can be illuminated to represent five different states. In another exemplary embodiment, the indicator 114 includes one or more digits where each digit is formed by seven segments and the number of segments illuminated corresponds to a different state. In still another exemplary embodiment, the indicator is a single LED whose brightness can be adjusted between 2, 3, 4, 5, or more brightness levels. Each brightness level indicates a different state.

The indicator 114 enables a user to quickly view the QoC metric, and if desired, to adjust the relative positions of the Tx and Rx coils so as to increase the QoC metric. To adjust the positions of the coils, a user need only move the charge receiving device around the charging surface. An increase in the QoC metric means that more energy is being transferred to the charge receiving device and therefore shorter battery charging times can be achieved.

In an exemplary embodiment, the Tx controller 108 and the QoC detector 112 are implemented on one or more integrated circuits on a circuit board. In still another exemplary embodiment, the Tx controller 108 and the QoC detector 112 are implemented on a single integrated circuit on a circuit board. In such an implementation, the functions of the QoC detector 112 are integrated into and performed by the functional elements of the Tx controller 108.

Figure 3:
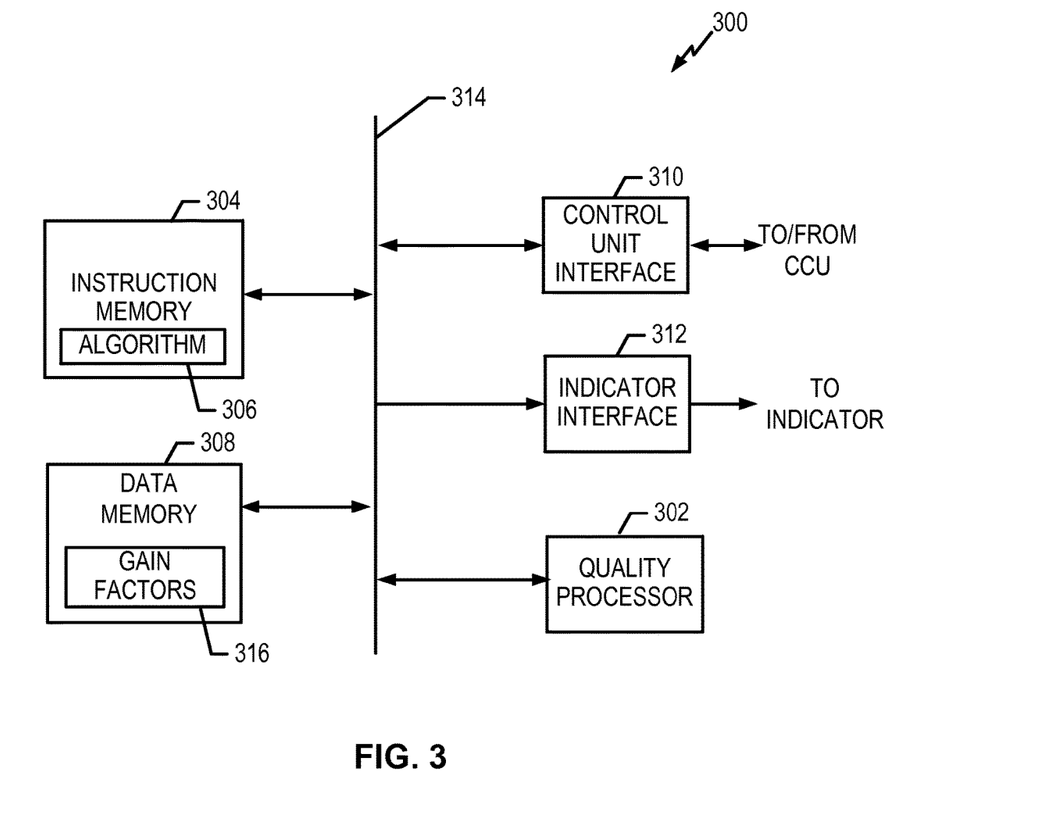
FIG. 3 shows a detailed exemplary embodiment of a QoC detector.

FIG. 3 shows a detailed exemplary embodiment of a QoC detector 300. For example, the QoC detector 300 is suitable for use as the QoC detector 112 shown in FIG. 2. The QoC detector 300 comprises quality processor 302, instruction memory 304, data memory 308, control unit interface 310, and indicator interface 312, all coupled to communicate over communication bus 314.

The quality processor 302 comprises at least one of a CPU, processor, gate array, hardware logic, discrete circuits, memory elements, and/or hardware executing software. The quality processor 302 operates to control the other functional elements of the QoC detector 300 using the communication bus 314.

The instruction memory 304 comprises any suitable memory or storage device that allows for storing, retrieving, and maintaining instructions associated with QoC detector 300. In an exemplary embodiment, the instruction memory 304 stores algorithm instructions 306. The algorithm instructions 306 can be executed by the quality processor 302 to perform an algorithm to determine a QoC metric as described herein.

The data memory 308 comprises any suitable memory or storage device that allows for storing, retrieving, and maintaining data associated with the operation of the QoC detector 300 to determine a QoC metric. In an exemplary embodiment, the data memory 304 stores input and output power parameters, analog signal data, and other data associated with a power transfer through an inductive coupling. The power parameters and other data are used by the quality processor 302 when executing the algorithm 306 to determine the QoC metric. In an exemplary embodiment, the data memory 308 stores gain factors 316 that are used by the algorithm to determine the QoC metric. The gain factors 316 may be pre-stored into the data memory 308 or loaded during system initialization or operation.

The control unit interface 310 comprises hardware and/or hardware executing software that operates to provide communications between the QoC detector 300 and the CCU 202. For example, the quality processor 302 operates to send and receive information to/from the CCU 202 using the control unit interface 310. In an exemplary embodiment, the control unit interface 310 utilizes a serial or parallel data communication technology to communicate with the CCU 202.

The indicator interface 312 comprises hardware and/or hardware executing software that operates to output QoC values to be displayed on an indicator having multiple states, such as the indicator 114 shown in FIG. 2. In an exemplary embodiment, the indicator interface 312 utilizes a serial or parallel data communication technology to communicate with the indicator 114.

During operation, the QoC detector 300 operates to receive data, parameters, and/or other information from the CCU 202 through the control unit interface 310 and stores this information in the data memory 308. The quality processor 302 executes instructions from the instruction memory 304 to process the stored data. For example, the algorithm instructions 306 are executed by the quality processor 302 to perform an algorithm that processes the data stored in the memory to determine QoC metrics associated with an inductive coupling.

In an exemplary embodiment, the quality processor 302 operates to convert the determined QoC metric to a QoC value for display on the indicator 114. For example, the indicator 114 is capable of displaying multiple states and the quality processor 302 operates to map the QoC metric to a particular indicator state. For example, if the QoC metric has a range of (0-100) and the indicator is capable of displaying five states, then the quality processor 302 maps a portion of the QoC metrics range to each state. For example, a metric in the range of 0-20 would be mapped to the first indicator state and so forth. A QoC value is then determined which will cause the indicator to indicate the desired state that corresponds with the QoC metric. The quality processor 302 then controls the indicator interface 312 to output indicator values associated with the QoC metric to the indicator 114 for display to a user.

It should be noted that the QoC detector 300 represents just one implementation and that other implementations are possible. For example, the QoC detector 300 may be implemented in discrete logic that eliminates the need for a quality processor or memory devices. In another implementation, the functions and/or implementations of the QoC detector 300 are incorporated or integrated in the CCU 202. For example, the circuitry of the QoC detector 300 is integrated into the CCU 202 and the functions of the quality processor 302 are performed by the controller 222.

Figure 4:
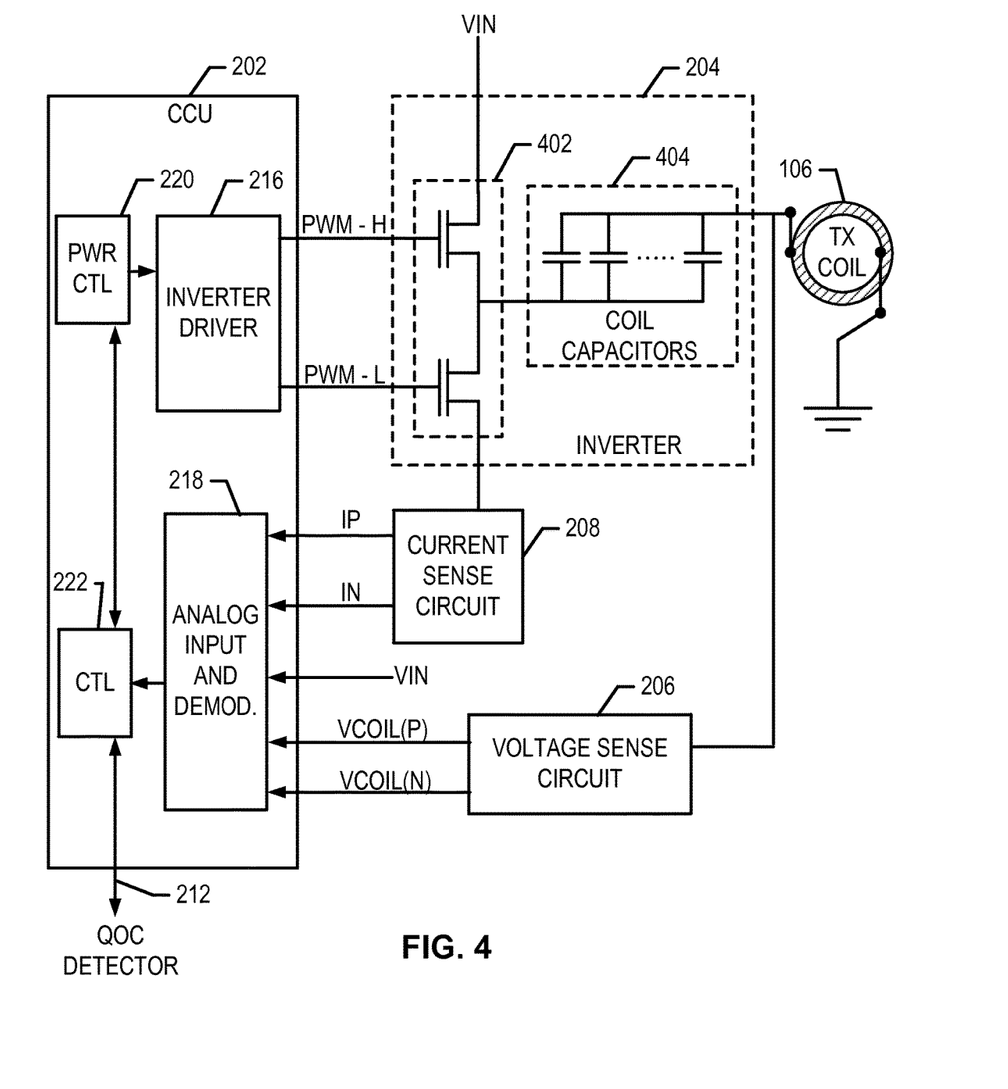
FIG. 4 shows a detailed exemplary embodiment of an inverter for use in an inductive charging device.

FIG. 4 shows a detailed exemplary embodiment of the inverter 204. The inverter 204 comprises a pair of field effect transistors (FETs) 402 that are connected to receive pulse width modulated (PWM) signals from the inverter driver 216. The transistors 402 are also connected to receive the input voltage signal Vin that is switched to drive the Tx coil 106. The output of the transistors 402 is input to a plurality of coil capacitors 404, which are further connected to the Tx coil 106. Thus, the inverter 204 forms a half bridge inverter circuit. The current sense circuit 208 is connected to the transistors 402 to sense current and provide current sense signals Ip and In to the analog input and demodulator 218. The voltage sense circuit 206 is connected to the Tx coil 106 to sense voltage and provide voltage sense signals Vcoil(p) and Vcoil(n) to the demodulator 218. It should be noted that the current sense circuit 208 and the voltage sense circuit 206 are not limited to any specific implementation and that any suitable sense circuitry may be utilized. In an exemplary embodiment, the analog input and demodulator 218 also receives the input voltage Vin.

During operation, the inverter driver 216 outputs the PWM-H and PWM-L signals to control the transistors 402 to switch the Vin signal to the Tx coil 106. Thus, the power provided to the Tx coil 106 is controlled by the inverter driver 216. A charge receiving device can change its load characteristics to modulate the power transfer so as to cause current and voltage modulation that can be sensed by the current 208 and voltage 206 sense circuits. The sensed modulation is provided to the analog input and demodulator 218, which extracts messages that are then provided to the controller 222. Digitized information, such as the sense current, sense voltage, Vin, and any other analog signals are also provided to the controller 222 from the analog input and demodulator 218. Thus, the charge receiving device can send messages through the inductive coupling to the CCU 202 and information contained in those messages along with other parameters is passed to the controller 222. The controller 222 also provides the information to the QoC detector 300 through the signal path 212.

Figure 5:
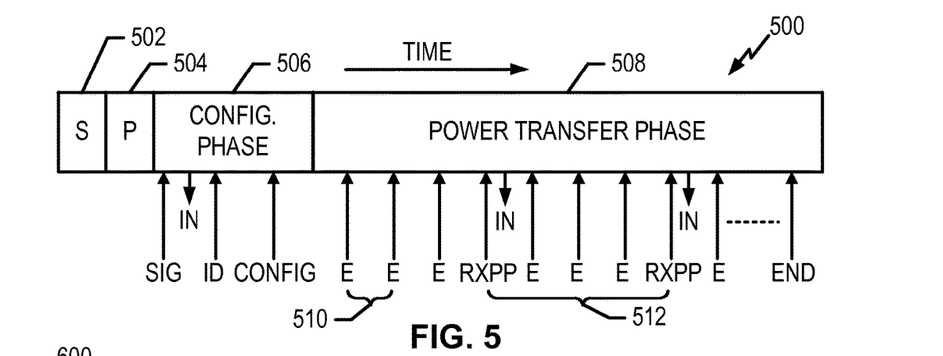
FIG. 5 shows an exemplary embodiment of an inductive charging timeline.

FIG. 5 shows an exemplary embodiment of an inductive charging timeline 500. For example, the inductive charging timeline 500 is suitable for use by the Tx controller 108 to transfer power to the charge receiving device 116. The inductive charging timeline comprises four phases. The first phase is a selection phase 502 during which a determination is made by the Tx controller 108 as to whether or not a receiving device has been placed on the charging surface 104. For example, the CCU 202 may control its various functional elements to detect a resonant shift in a power signal due to an object be placed on the charging surface 104.

If it is determined during the selection phase 502 that a receiving device has been placed on the charging surface 104, a ping phase 504 is entered. During the ping phase 504, the CCU 202 initiates a ping signal that energizes the Tx coil 106 at a preset power level.

After the ping phase 504, a configuration phase 506 is entered. During the configuration phase 506, the charge receiving device transmits various configuration messages to the CCU 202 to prepare for power transfer. A signal strength message (Sig) is transmitted from the charge receiving device and indicates the currently received signal strength in response to the ping signal. At this point, the CCU 202 passes information from the Sig message along with other parameters to the QoC detector 300, which performs the algorithm 306 to determine a QoC metric. The QoC metric is converted to a QoC value that is output to the indicator 114. The output to the indicator 114 is shown as (In) appearing after the Sig message during the configuration phase 506.

An identification message (ID) is also transmitted from the charge receiving device and provides identification information related to the receiving device. A configuration message (Config) is also transmitted from the charge receiving device and provides configuration information related to the charge receiving device. After receiving the configuration message (Config) a power transfer phase 508 is entered.

During the power transfer phase 508, control error messages (E) are transmitted from the charge receiving device to the CCU 202 through the inductive coupling. The control error messages indicate how the transmit power is to be adjusted. For example, the control error messages indicate whether or not the transmit power is to be increased or decreased to achieve desired power levels at the receiving device. For example, the charge receiving device may want more or less power based on its battery's charging characteristics. The time between error messages is illustrated at 510. For example, in an exemplary embodiment, the charge receiving device transmits E messages to adjust the transmit power approximately every 0.25 seconds.

The charge receiving device also transmits received power packet (RxPP) messages, which indicate the measured power level that is being received by the charge receiving device. For example, the CCU 202 adjusts the transmit power in response to one or more E messages. The RxPP message indicates the power level currently being received after one or more power adjustments. The time between RxPP messages is illustrated at 512. For example, in an exemplary embodiment, the charge receiving device transmits RxPP messages approximately every 1.5 seconds.

After each RxPP message, the QoC detector 300 operates to determine the QoC metric as describe above. Once the QoC metric is determined it is converted to a QoC value that is output to the indicator (In) as illustrated after each RxPP message. In an exemplary embodiment, the charge receiving device may indicate that charging is complete by transmitting an end power transmission (End) message to the CCU 202. In another exemplary embodiment, after charging is complete, the CCU 202 continues power transfer at a lower level to provide a trickle current to maintain the battery charge and device operation.

Figure 6:
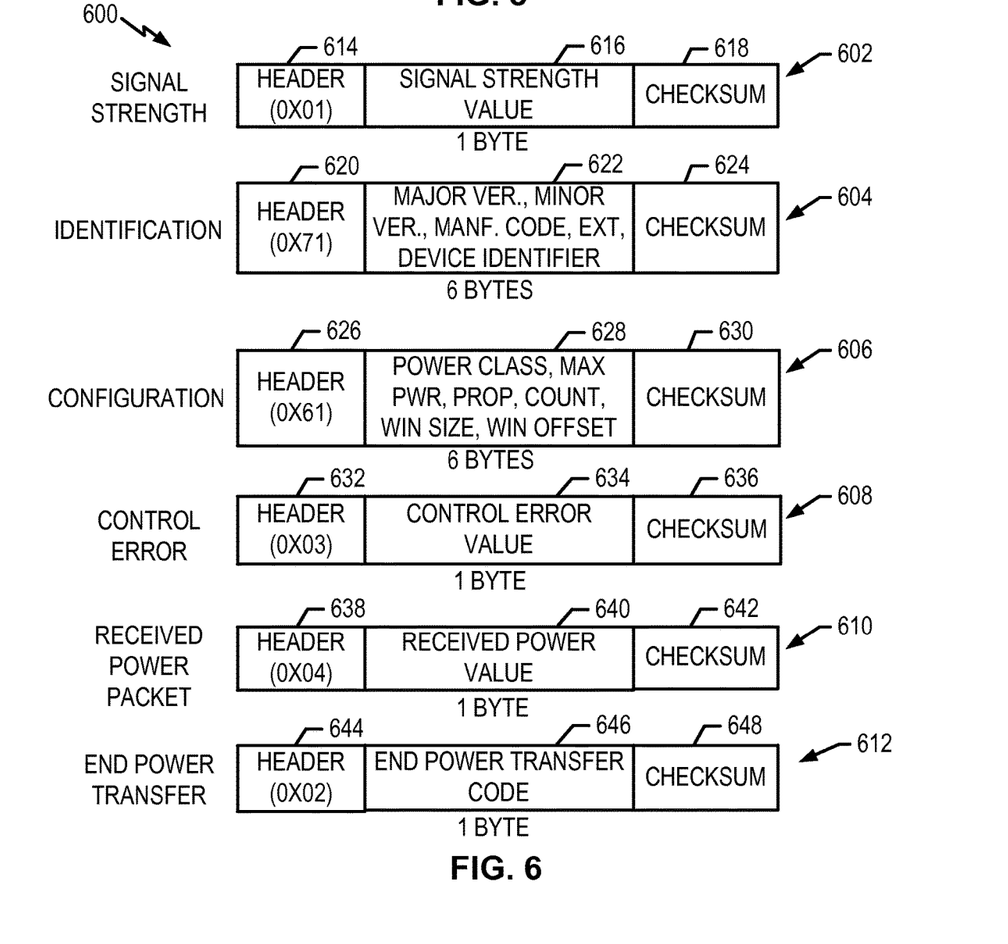
FIG. 6 shows an exemplary embodiment of communication messages for use during inductive charging.

FIG. 6 shows an exemplary embodiment of communication messages 600 for use during inductive charging. For example, the communication messages are transmitted by a charge receiving device to the CCU 202 over the inductive coupling.

A signal strength message 602 comprises a header 614, a signal strength value 616 and a checksum 618. The signal strength value 616 is one byte in length and indicates received signal strength as measured by a charge receiving device. In an exemplary embodiment, the header of the signal strength message 602 is set to a value of "01" in hexadecimal format. The signal strength message is transmitted by a charge receiving device during the configuration phase. In an exemplary embodiment, the signal strength value is a value in the range of 0-255 that can be mapped to a corresponding signal power value.

An identification message 604 comprises header 620, identification values 622, and checksum 624. The identification information 622 is 6 bytes in length and includes information about the receiving device, such as major and minor version numbers, manufacturer codes, device identifier and any other information associated with a receiving device. In an exemplary embodiment, the header 620 of the identification message 604 is set to a value of "71" in hexadecimal format.

A configuration message 606 comprises header 626, configuration information 628, and checksum 630. The configuration information 628 is 6 bytes in length and includes power class, maximum power, prop, count, window size, and window offset associated with a receiving device. In an exemplary embodiment, the header 626 of the configuration message 606 is set to a value of "61" in hexadecimal format.

A control error message 608 comprises header 632, control error value 634, and checksum 636. The control error value 634 is one byte in length and includes a control error value that indicates how power is to be adjusted by the CCU 202. In an exemplary embodiment, the header 632 of the control error message 608 is set to a value of "03" in hexadecimal format. The control error value is in the range of −128 to 127 and indicates how power is to be adjusted with a minus number indicating a decrease in power and a positive number indicating an increase in power.

A received power packet message 610 comprises header 638, received power value (RPV) 640, and checksum 642. The received power value 640 is one byte in length and indicates a received power level as measured by a charge receiving device. In an exemplary embodiment, the header 638 of the received power message 610 is set to a value of "04" in hexadecimal format. The received power value is processed according to the following expression.

$$\text{Signal Strength}=(RPV/128)*(\text{Maximum Power}/2)$$
$$*10^{\text{Power Class}} \text{ Watts}$$

An end power transfer message 612 comprises header 644, end power transfer code 646, and checksum 648. The end power transfer code 646 is one byte in length and indicates that the current power transfer is to be terminated by the CCU 202. In an exemplary embodiment, the header 644 of the end power transfer message 612 is set to a value of "02" in hexadecimal format.

Algorithm

In various exemplary embodiments, the QoC detector 300 operates to perform the algorithm 306 to determine QoC metrics. In an exemplary embodiment, system efficiency of the inductive charging system can be determined by the ratio of power out to power in. For example, power in is determined at the power transmitting device and power out is determined at the power receiving device. The algorithm uses the system efficiency and other criteria in its calculations to generate the QoC metric. There are a number of factors that can influence the generation of the QoC metric, including system implementation and load characteristics. For example, coil current (Icoil) and output power (from the Sig and RxPP messages), are used to determine input power. However, Icoil may be non-linear depending on load and this nonlinearity may impact the determination of the QoC metric.

In an exemplary embodiment, the algorithm determines a QoC metric that is independent of coil current. That is, the algorithm compensates for coil current in its calculation so that the QoC metric is the same across a range of coil currents. This is desirable because with a battery powered device, the coil current will be higher with a lower state of charge (SOC), and will be lower as the battery approaches full charge. Given the same placement of the charge receiving device on the charging pad, the QoC metric should be independent of the different SOC levels.

In an exemplary embodiment, the algorithm uses the input voltage (Vin), sensed coil current (Icoil) and sensed coil voltage (Vcoil). The input voltage (Vin) is the voltage supply to the inductive charging system and is used to drive the inverter 204 to generate the energy transferred by the primary coil 208. The sensed coil current is determined by the current sense circuit 208. The sensed current is used by the demodulator 218 to decode communications from the charge receiving device, and to determine the power transfer efficiency used to generate the QoC metric. The sensed coil voltage Vcoil is determined by the voltage sense circuit 206. The sensed coil voltage is used by the demodulator 218 to decode communications from the charge receiving device.

As mentioned above, the QoC metric is calculated to take into account non-linear Icoil characteristics. The algorithm performs a calibration to normalize the system efficiency and thereby compensate for non-linearity of the coil current. This allows QoC metrics to be generated independently of coil current, which generalizes the algorithm to work with battery-powered devices having different SOC levels.

Figure 12:
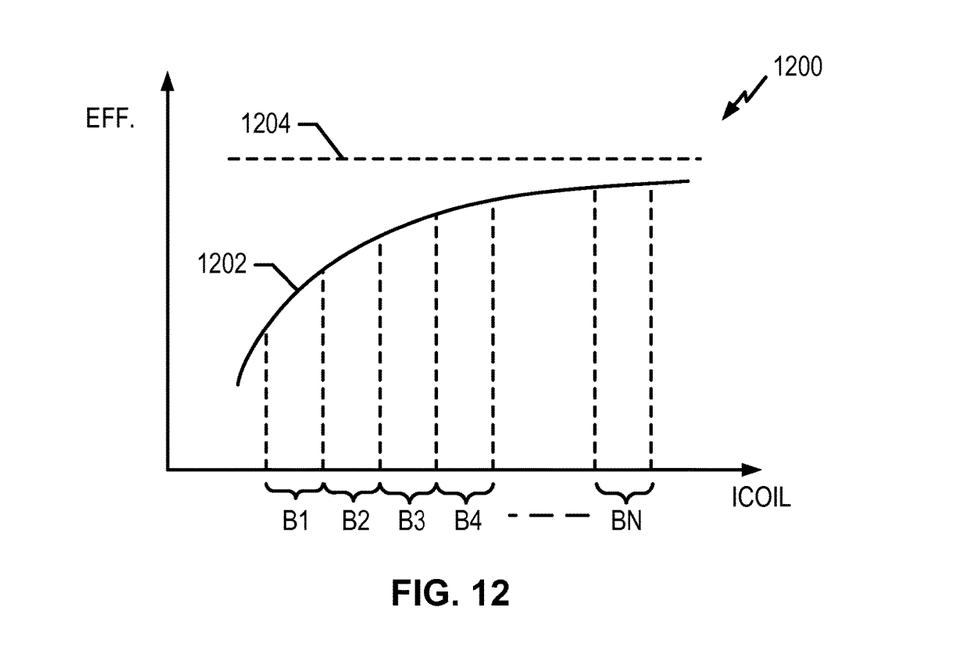
FIG. 12 shows a graph that illustrates a plot of exemplary system transfer efficiency over a range of coil current.

FIG. 12 shows a graph 1200 that illustrates a plot 1202 of exemplary system transfer efficiency over a range of coil currents. In an exemplary embodiment, the algorithm provides compensation by dividing the system transfer efficiency curve into 'bins', where each bin is a defined range of coil current. For example, there are n bins that are shown as b1 through bn. As part of the algorithm, each bin is associated with a gain factor, and therefore the gain factors are referred to as g1 through gn, respectively. In an exemplary embodiment, the gain factors 316 are stored in the data memory 308 and these gain factors can be retrieved by the quality processor 302 for use during execution of the algorithm 306.

In an exemplary embodiment, the gain factors operate to normalize the system transfer efficiency. For example, by compensating the coil current with its associated gain factor, flatness of the system transfer efficiency can be obtained over the range of coil currents as illustrated by the plot line 1204.

In an exemplary embodiment, the QoC metric is determined from the power out and compensated power in values. The power out value is determined from messages received from a charging receiving device. For example, the Sig message and RxPP message both provide an indication of power out that can be used by the algorithm. The compensated power in (Pin) is determined by the following formula.

Compensated $Pin = (Icoil * gain) * Vin$

The above gain is the gain factor associated with the bin in which the coil current is located. And as a result, the QoC metric is determined from the following formula.

$QoC = (Pout/(\text{Compensated } Pin))$

Therefore, the algorithm calculates the QoC metric by using the gain associated with the Icoil bin to normalize the result over the range of coil currents. Once the QoC metric is determined from the compensated coil current it can be mapped to a QoC value that is indicated to the user by the indicator 114 as discussed below.

Figure 13:
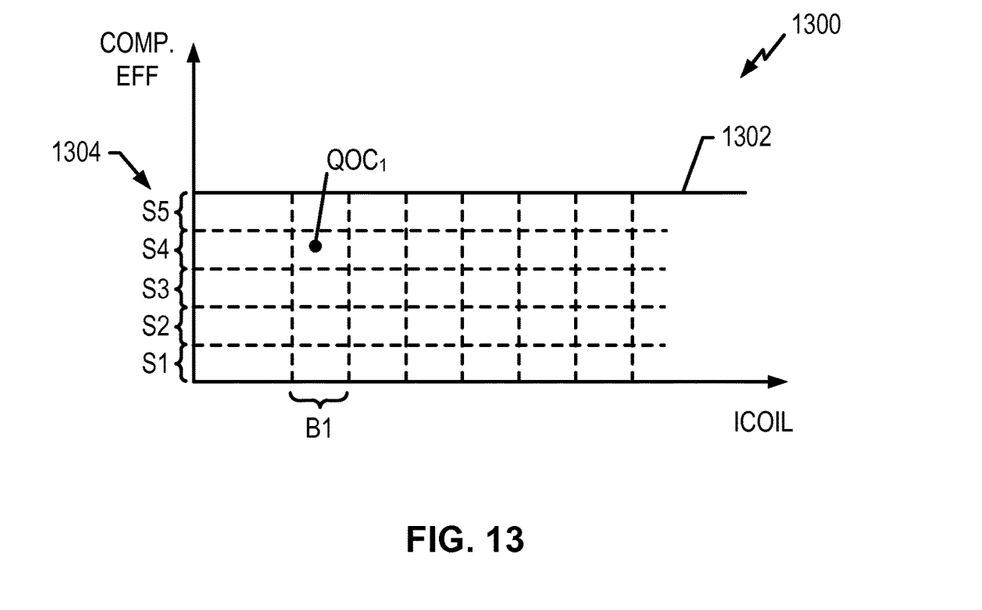
FIG. 13 shows a graph that illustrates how QoC metrics are converted to QoC values that are indicated to a user.

FIG. 13 shows a graph 1300 that illustrates how QoC metrics are converted to QoC values, which are then indicated to a user. The graph 1300 shows compensated system efficiency on the vertical axis and coil current on the horizontal axis. A plot line 1302 represents the maximum compensated system efficiency. The coil current on the horizontal axis is divided into current bins, such as bin b1. The compensated efficiency on the vertical axis is divided into states, eg five states S1-S5 are shown at 1304, but any number of states may be utilized.

During operation of the algorithm as described above, a QoC metric is determined, for example, a calculated QoC metric is referred to as $QoC_1$. The QoC1 metric is plotted on the graph 1300 and it is located in the bin b1 and in the state S4. In an exemplary embodiment, the quality processor 302 operates to determine the bin and corresponding state for a given QoC metric. Thus, the state S4 is used to generate the QoC value that is output to the indicator 114. In an exemplary embodiment, it will be assumed that the state S4 correspond to a QoC value of "60". This QoC value is then output to the indicator 114 and the value "60" is displayed by the indicator 114 to the user. Other indicators may be utilized as described below. Accordingly, the algorithm described herein operates to generate a QoC metric that is converted to a QoC value that is indicated to a user.

Figure 7:
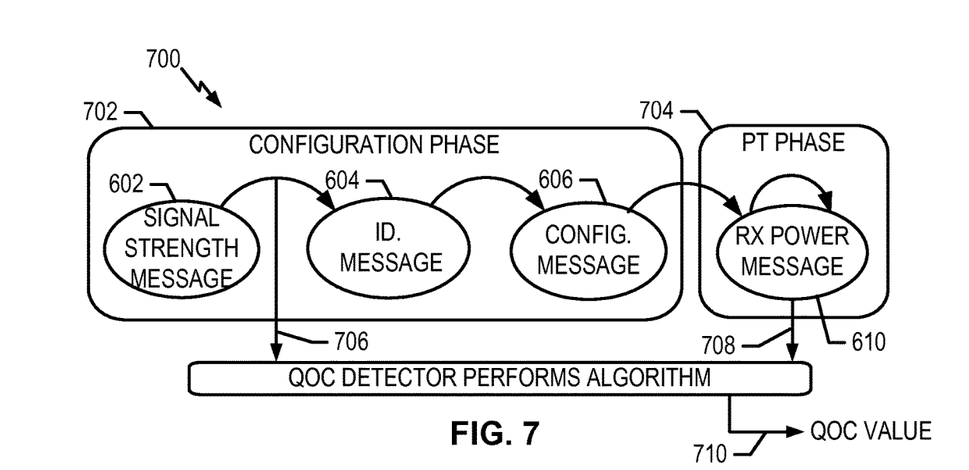
FIG. 7 shows an overview of the operation of the QoC detector to generate QoC metrics that are displayed to a device user.

FIG. 7 shows an overview 700 of the operation of the QoC detector 300 to generate QoC metrics that are displayed to a device user. During the configuration phase 702 three messages are transmitted from a charging receiving device to the CCU 202. The first message is the signal strength message 602, the second message is the identification message 604, and the third message is a configuration message 606. After receipt of the signal strength message 602, the CCU 202 sends the signal strength value and other parameters to the QoC detector 300 as shown at 706. In an exemplary embodiment, the signal strength value and other parameters are received by the control unit interface 310. This information is processed by quality processor 302 using the algorithm 306 and gain factors 316 to generate a QoC metric. The QoC metric is then converted to a QoC value that is output to the indicator 114 as shown by 710. Thus, the QoC detector 300 operates to generate the QoC metric in the configuration phase 702 to provide user feedback as quickly as possible after the device has been placed on the charging surface. This feedback occurs before the receipt of any RxPP messages by the CCU 202.

During the power transfer phase 704 RxPP messages 610 are transmitted from a charging receiving device to the CCU 202. The RxPP messages 610 are transferred over the course of the power transfer phase at intervals in the range of 1.5 to 4 seconds. After receipt of each RxPP message 610, the CCU 202 sends the receive power value and other parameters to the QoC detector 300 as shown at 708. In an exemplary embodiment, the received power value and other parameters are received by the control unit interface 310. This information is processed by quality processor 302 using the algorithm 306 and gain factors 316 to generate a QoC metric. The QoC metric is then converted to a QoC value that is output to the indicator 114 as shown by 710. Thus, during the power transfer phase 704, QoC metrics are determined after each RxPP message and these metrics are indicated to the user throughout the power transfer phase 704.

Figure 8:
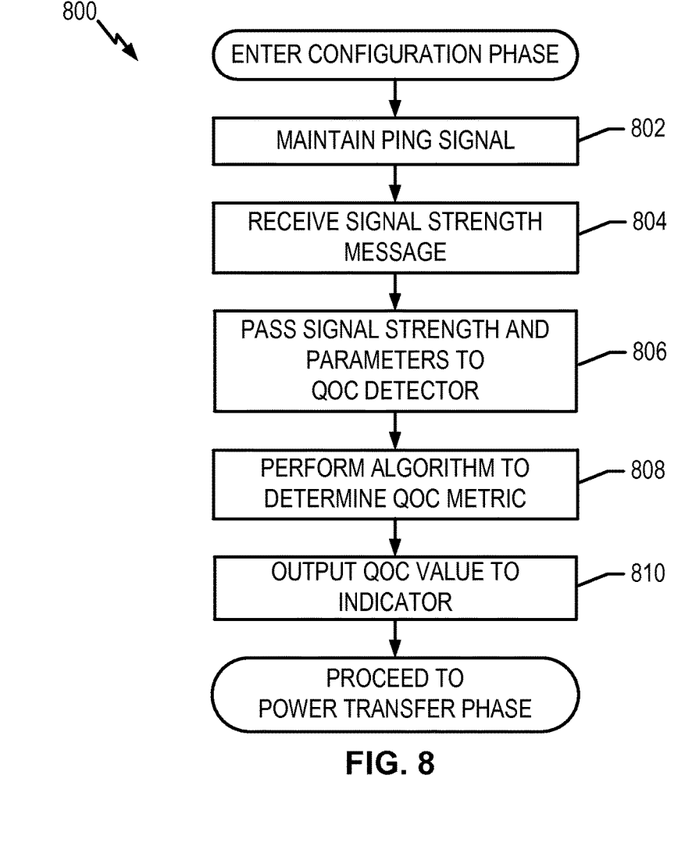
FIG. 8 shows an exemplary embodiment of a method for detecting and displaying a QoC metric during a configuration phase of an inductive charging process.

FIG. 8 shows an exemplary embodiment of a method 800 for detecting a QoC metric and displaying a QoC value during the configuration phase of an inductive charging process.

At block 802, upon entering the configuration phase, a power level of the ping signal is maintained at its initial power level. For example, the CCU 202 controls the inverter 204 to maintain the ping power level to the Tx coil 106.

At block 804, a signal strength message is received from the charge receiving device. The signal strength message includes the signal strength value 616 as shown in FIG. 6. For example, the CCU 202 receives the signal strength message from the charge receiving device through the inductive coupling between the Tx and Rx coils. The signal strength value is converted to a corresponding power level by the CCU 202.

At block 806, the signal strength message and other parameters are passed to the QoC detector 300. For example, the controller 222 of the CCU 202 passes the signal strength and other parameters to the QoC detector 300 using the communication path 212. In an exemplary embodiment, the signal strength and other parameter are received by the control unit interface 310 and stored in the data memory 308.

At block 808, an algorithm is performed to determine the QoC metric of the inductive coupling established between the Tx and Rx coils. For example, the quality processor 302 executes the algorithm instructions 306 to process the data stored in the memory 308 to determine the QoC metric of the inductive coupling. In an exemplary embodiment, the QoC metric is determined from a ratio of the received signal power indicated in the signal strength message and the ping power level.

At block 810, a quality value is output to an indicator to indicate the QoC metric to a user. For example, the quality processor 302 converts the detected QoC metric to a QoC value that is suitable for display on the indicator 114. The indicator 114 is capable of indicating a plurality of states that are associated with a range of QoC values. After the quality value is output to the indicator 114, the method proceeds to the power transfer phase.

It should be noted that the method 800 is exemplary and that the operations can be changed, rearranged or otherwise modified to produce alternative methods which are within the scope of the exemplary embodiments.

Figure 9:
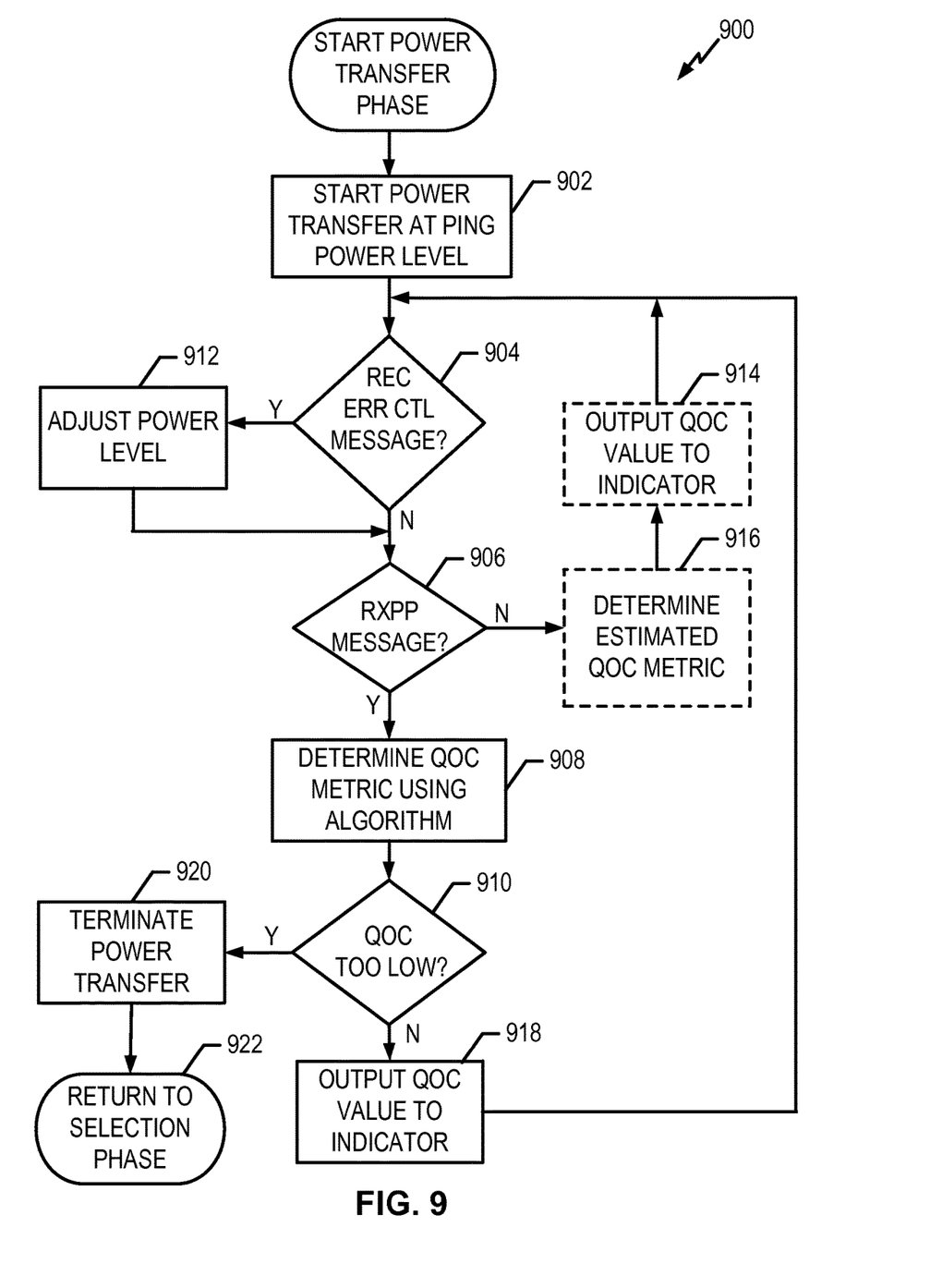
FIG. 9 shows an exemplary embodiment of a method for detecting and displaying a QoC metric during a power transfer phase of an inductive charging process.

FIG. 9 shows an exemplary embodiment of a method 900 for detecting a QoC metric and displaying a QoC value during the power transfer phase of an inductive charging process.

At block 902, the power transfer is started at the power level of the ping signal. For example, the CCU 202 controls the inverter 204 to maintain the ping power level at the start of the power transfer phase.

At block 904, a determination is made as to whether a control error message is received at the Tx controller 202. For example, the Rx controller 120 can send control error messages 608 to the Tx controller 202 through the inductive coupling. If a control error message has been received, the method proceeds to block 912. If a control error message has not been received, the method proceeds to block 906.

At block 912, the power level at the Tx coil is adjusted based on the received control error message. For example, the CCU 202 decodes the control error message and controls the power controller 220 and inverter driver 216 to adjust (increase or decrease) the power at the Tx coil 106 based on the received control error message.

At block 906, a determination is made as to whether an RxPP message is received at the Tx controller. For example, the Rx controller 120 outputs the RxPP message 610 to the Tx controller 108 to indicate the currently received power level. If an RxPP message has been received by the Tx controller 108, the method proceeds to block 908. If a RxPP message has not been received, the method proceeds to block 916.

Blocks 916 and 914 are performed in an optional exemplary embodiment. For example, at block 916, even though a RxPP message has not been received, an estimate of the QoC metric is made based on other criteria, such as past error control messages or by using other power estimating techniques. Such an estimate is performed by the QoC detector 300 based on parameters received from the CCU 202 and/or information stored at the QoC detector 300. At block 914, the estimated QoC metric is converted to a QoC value and displayed on the indicator 114. For example, the QoC detector 300 converts the QoC metric to a QoC value and outputs the QoC value to the indicator 114. If the operations of blocks 916 and 914 are not desired, these blocks are bypassed and the method proceeds to block 904.

At block 908, a QoC metric is determined using the algorithm 306 provided by the QoC detector 300. For example, parameters including the received power value are passed to the QoC detector 300 from the CCU 202. The QoC detector 300 then operates as disclosed herein to determine the QoC metric using the algorithm 306. In an exemplary embodiment, the QoC metric is determined from a ratio of the received signal power indicated in the RxPP message and the current level of the input power.

At block 910, a determination is made as to whether the QoC metric is too low. For example, if the QoC metric is too low then the power transfer will be terminated. In an exemplary embodiment, the quality processor 302 compares the QoC metric to a threshold value and if the QoC metric is below the threshold value, the QoC metric is determined to be too low. In this case, the method proceeds to block 920. If the QoC metric is above the threshold, the method proceeds to block 918.

At block 920, the power transfer is terminated. For example, the QoC detector 300 sends the QoC metric to the CCU 202 using the communication channel 212 and indicates that the value is too low. The CCU 202 then operates to control the power controller 220 and the inverter driver 216 to terminate the power transfer. The method then returns to the selection phase at block 922.

At block 918, the QoC metric is converted to a QoC value and displayed to the device user. In an exemplary embodiment, the QoC processor 302 converts the QoC metric to a QoC value and outputs the QoC value to the indicator 114. The method then proceeds to block 904 to repeat the process for the duration of the power transfer. By repeating the process during the charging cycle, a charge receiving device that is moved on a charging surface will change the indicated QoC metric. This allows a user to move the charge receiving device to increase or maximize the indicated QoC metric, which will result in an increased or maximized energy transfer and thereby reduce battery charging times. Obtaining the increased or maximized QoC metric may also result in improved charger efficiency, reduced heat generation, and reduced energy consumption.

It should be noted that the method 900 is exemplary and that the operations can be changed, rearranged or otherwise modified to produce alternative methods which are within the scope of the exemplary embodiments.

It should also be noted that while the method 900 is performed, other parallel processes may also be performed and these other processes may detect one or more other conditions that result in termination of the power transfer. Should any of the conditions be detected, the method 900 would be terminated at its current operational step.

Figure 10:
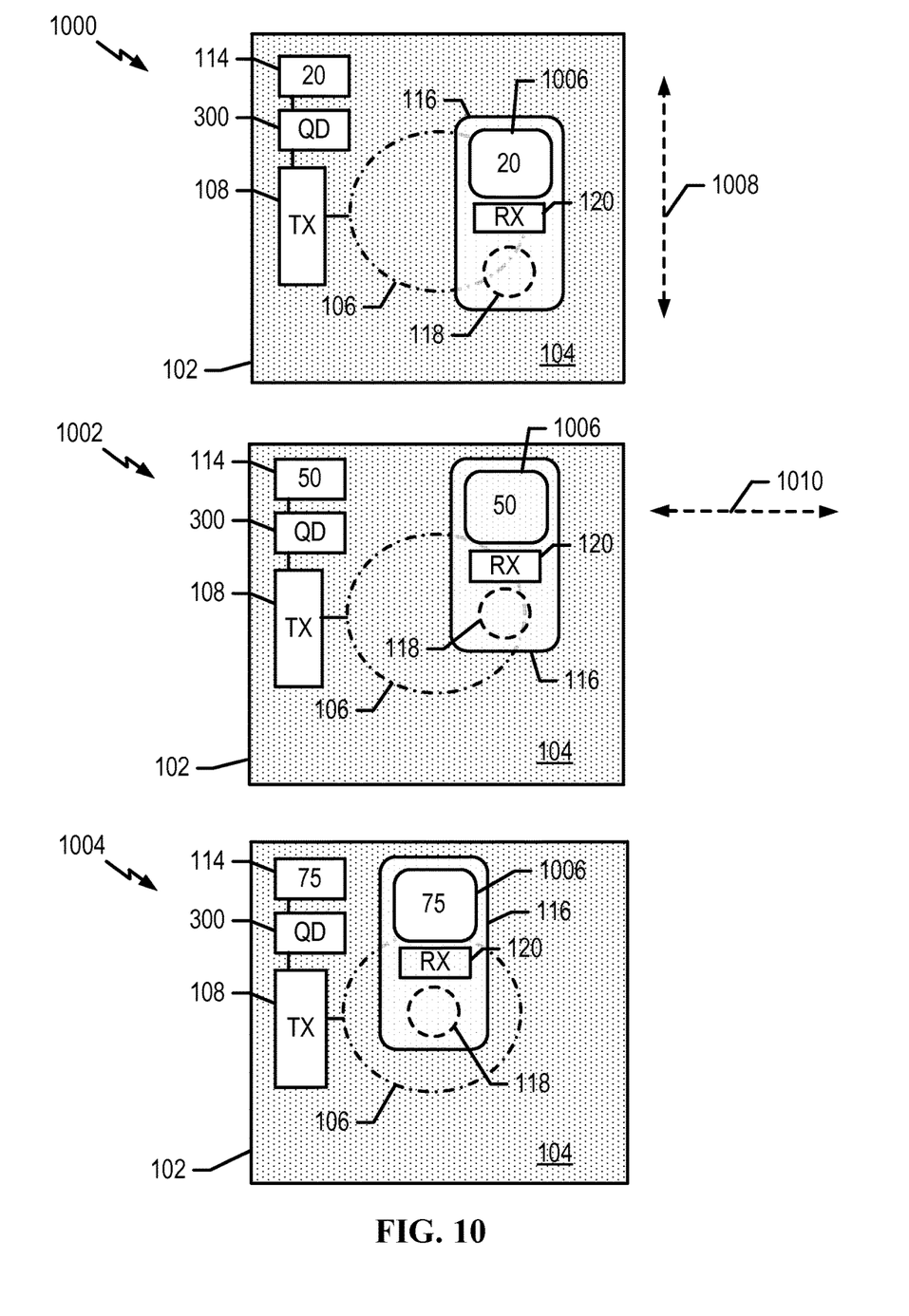
FIG. 10 illustrates the operation of the exemplary QoC detector in an exemplary inductive charging process.

FIG. 10 illustrates the operation of the exemplary QoC detector 300 in an exemplary inductive charging process. As illustrated in a first view 1000, the charging device 102 includes the Tx controller 108, the Tx coil 106, the QoC detector 300 and the indicator 114. As further illustrated in the view 1000, the charge receiving device 116 is placed on the charging surface 104. The charge receiving device 116 includes the Rx coil 118 and the Rx controller 120. The charge receiving device 116 also includes a display 1006.

Selection and Ping Phases

After the device 116 is placed on the charging surface 104, the Tx controller 108 proceeds through the selection and ping phases as described above. It will be assumed that these phases complete successfully and that the charging process will now enter the configuration phase.

Configuration Phase

In the configuration phase, the Tx controller 108 operates in accordance with the method 800 shown in FIG. 8. Thus, the Tx controller 108 maintains the ping power level and receives a Sig message 602 from the Rx controller 120 through the inductive coupling between the Tx coil 106 and the Rx coil 118. The Sig message 602 is decoded to obtain the signal strength value 616 which is passed from the Tx controller 108 to the QoC detector 300 along with any other desired parameters. At the QoC detector 300, the algorithm 306 is performed to determine the QoC metric that is converted to a QoC value and displayed on the indicator 114 by the QoC detector 300. For the purpose of this example, the QoC value is determined to be "20", which is displayed on the indicator 114 in view 1000. Thus, in response to the Sig message received at the beginning of the configuration phase, the user is quickly provided with the QoC metric. It will be assumed that the configuration phase completes successfully with the Tx controller 108 receiving the ID message 604 and the configuration message 606 from the Rx controller 120. The charging process now proceeds to the power transfer phase.

Power Transfer Phase

In the power transfer phase, the Tx controller 108 operates in accordance with the method 900 shown in FIG. 9. Thus, the Tx controller 108 maintains the ping power level and receives one or more error messages 608 from the Rx controller 120 through the inductive coupling between the Tx coil 106 and the Rx coil 118. Each error message 608 is decoded to obtain the control error value 634 which is processed by the Tx controller 108 to determine any requested adjustments to the power provided to the Tx coil 106.

The Tx controller 108 also receives RxPP messages 610 from the Rx controller 120. Each RxPP message 610 is decoded to obtain a received power value 640 that indicates the power being received at the Rx coil 118. The received power value 640 is passed from the Tx controller 108 to the QoC detector 300 along with any other desired parameters. At the QoC detector 300, the quality processor 302 performs the algorithm 306 to determine the QoC metric based on the received power value 640 and other available parameters. The QoC metric then is converted to a QoC value and displayed on the indicator 114 by the quality processor 302. For example, the QoC value that is determined is "20" and it is displayed on the indicator 114. Thus, throughout the power transfer phase, the user is provided (at the indicator 114) with the QoC value determined after each RxPP message 610.

Based on the displayed QoC value, the user may move the charge receiving device 116 to increase the QoC metric and thereby increase the energy transfer between the Tx coil 106 and the Rx coil 118. By increasing the QoC metric more energy will be transferred to the charge receiving device 116 and result in faster battery charge times. It will be assumed that the user moves the charge receiving device 116 as indicated by the direction indicator 1008. After the move, the relative positions of the Tx coil 106 and the Rx coil 118 are now shown in view 1002.

As illustrated in view 1002, after the charge receiving device 116 is moved, the Tx coil 106 and the Rx coil 118 have improved alignment, which results in an increased energy transfer. As additional RxPP messages 610 are processed according to the method 900 by the Tx controller 108 and the QoC detector 300, the change in the QoC value can be seen on the indicator 114 by the user. For example, after moving the charge receiving device 116 in the direction 1008, the QoC value has increased to "50" as displayed by the indicator 114 in view 1002.

It will be assumed that the user now moves the charge receiving device 116 as indicated by the direction indicator 1010. After the move, the relative positions of the Tx coil 106 and the Rx coil 118 are now shown in view 1004.

As illustrated in view 1004, after the charge receiving device 116 is moved, the Tx coil 106 and the Rx coil 118 have improved alignment, which results in an increased energy transfer. As additional RxPP messages 610 are processed according to the method 900 by the Tx controller 108 and the QoC detector 300, the change in the QoC value can be seen on the indicator 114 by the user. For example, after moving the charge receiving device 116 in the direction 1010, the QoC value has increased to "75" as displayed by the indicator 114 in view 1004. The devices then continue in the power transfer phase until an end power transfer message 612 is received by the Tx controller 108 to complete the power transfer. In another exemplary embodiment, after a battery charge complete status is determined, the Tx controller 108 operates to continue the power transfer at a level that will provide a trickle current to maintain the battery charge and device operation.

Thus, the QoC detector 300 operates to quickly display a QoC metric to a device user during an inductive charging process. Using the indicated QoC metric, the user can move the charge receiving device on the charging surface to adjust the relative positions of the Tx and Rx coils to increase the energy transfer and provide shorter battery charge times.

In an alternative embodiment, the QoC value is also displayed on a device display 1006. For example, the Tx controller 108 and the Rx controller 120 are modified to allow messages to be passed from the Tx controller 108 to the Rx controller 120. For example, in one exemplary embodiment, the messages pass through the inductive coupling. In another exemplary embodiment, the messages pass through a secondary communication channel, such as a Bluetooth communication channel.

In this embodiment, the Tx controller 108 is configured to receive the QoC value from the QoC detector 300 through the signal path 212. The Tx controller 108 then passes the QoC value to the Rx controller 120 using the inductive coupling or other communication channel. The Rx controller 120 receives the QoC value and displays it on the charge receiving device display 1006. Thus, as shown in all three views (1000, 1002, and 1004) the display 1006 displays the same QoC value as the indicator 114.

Figure 11:
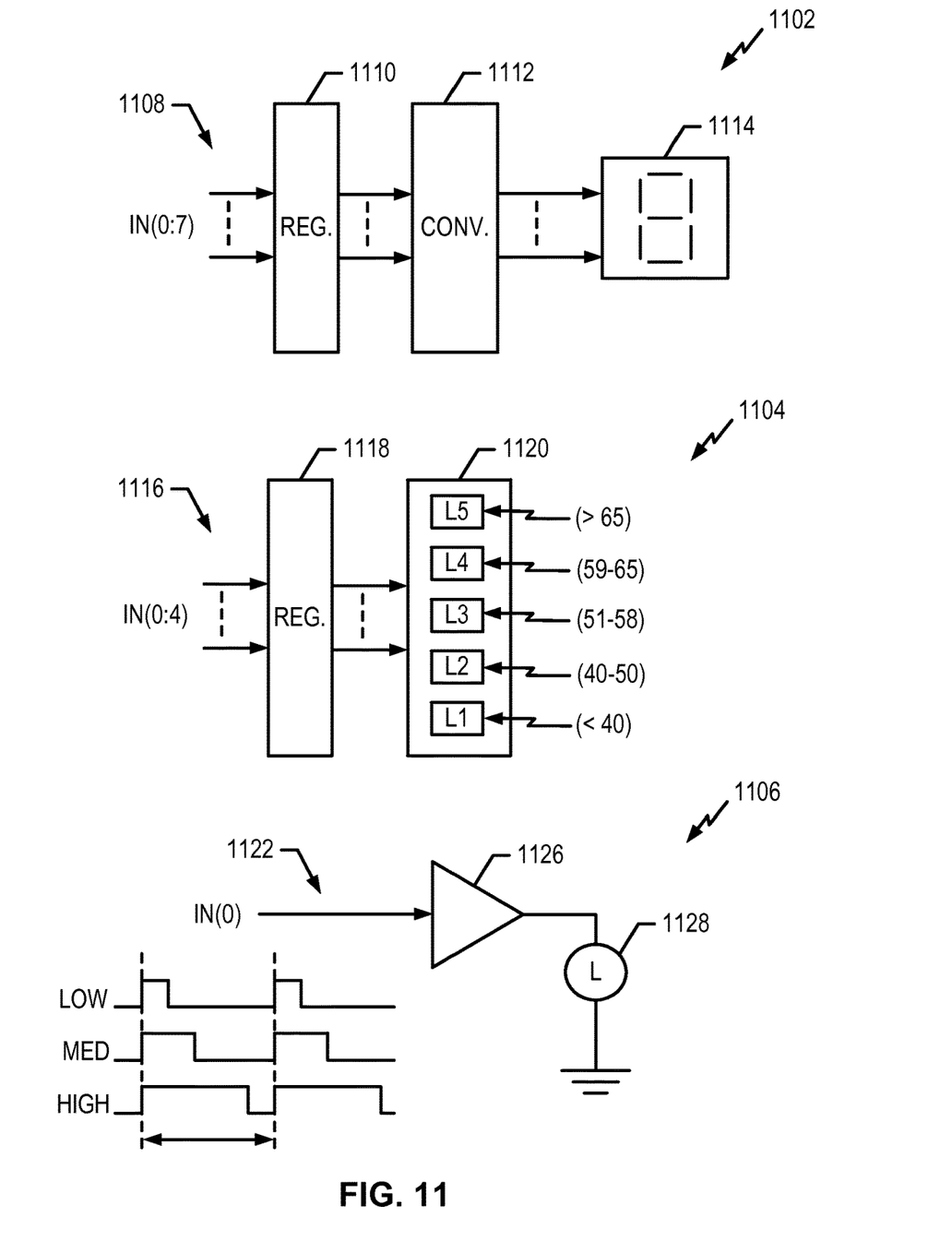
FIG. 11 shows three exemplary embodiments of indicators having multiple states for use with exemplary embodiment of a QoC detector.

FIG. 11 shows three exemplary embodiments of indicators for use with exemplary embodiments of a QoC detector. For example, indicators shown in FIG. 11 are suitable for use with the QoC detector 300 shown in FIG. 3. It will be assumed that the indicator interface 312 outputs QoC values on a data bus (In[0:7]) that is coupled to the indicators shown in FIG. 11. It is also possible that the indicator interface 312 outputs QoC values in a serial communication bus. However, this serial communication bus can be converted to an 8-bit data bus to allow use with the exemplary indicators shown in FIG. 11.

A first exemplary indicator is shown at 1102. The 8-bit data (In[0:7]) received from the indicator interface 312 is shown at 1108. The register 1110 receives and stores the QoC value and outputs the stored value to a converter 1112 that converts the 8-bit value for display on a seven segment digit display 1114. The digit display 1114 is capable of displaying 10 states (i.e., 0-9). In an exemplary embodiment, one or more digit displays 1114 can be used to display the entire QoC value. In an exemplary embodiment, the register 1110 and converter 1112 are incorporated into the QoC detector 300.

A second exemplary indicator is shown at 1104. The 5-bit data (In[0:4]) representing the QoC value is received from the indicator interface 312 is shown at 1116. The register 1118 receives and stores the QoC value and outputs the stored value to a device 1120 that includes five LEDs (L1-L5). The device 1120 is capable of displaying at least five states by illuminating a different LED for each state. For example, a range values associated with each LED is shown. Thus, in an exemplary embodiment, each bit enables/disables a corresponding LED. It is also possible to display more than five states by illuminating one or more LEDs for each state. In an exemplary embodiment, any number of LEDs may be used to display the QoC value.

A third exemplary indicator is shown at 1106. A QoC value represented by 1-bit data (In[0]) is received from the indicator interface 312 is shown at 1122. An amplifier 1126 amplifies the value to drive a single LED 1128 that is capable of illumination over a wide range of brightness levels. The LED 1128 is capable of displaying multiple states by changing its illumination based on the timing of the 1-bit data (In[0]). For example, three exemplary timing configurations are shown at 1130. In a low intensity setting, the duty cycle of the 1-bit data (In[0]) is set to a minimum level. In a medium intensity setting, the duty cycle of the 1-bit data (In[0]) is greater than the low intensity setting. In a high intensity setting, the duty cycle of the 1-bit data (In[0]) is greater than the medium intensity setting. Thus, as the QoC value changes based on the duty cycle of the 1-bit data (In[0]), the brightness of the LED 1128 changes accordingly. In an exemplary embodiment, any number of LEDs 1128 may be used to display the QoC value.

Accordingly, various modifications, adaptations, and combinations of various features of the described exemplary embodiments can be practiced without departing from the scope of the invention as set forth in the claims.

What is claimed is:

1. An apparatus, comprising:
   an inductor that receives a current signal to generate an electromagnetic field during a power transfer to an external device;
   a quality detector to determine a quality metric associated with the power transfer; and
   an indicator that indicates multiple states, wherein one of the multiple states indicates the quality metric.

2. The apparatus of claim 1, wherein the quality detector determines power efficiency associated with the power transfer as the quality metric.

3. The apparatus of claim 1, further comprising a controller to generate a ping signal at a ping power level that is input to the inductor to generate the electromagnetic field and to receive a signal strength indicator that indicates received signal power in response to the ping signal.

4. The apparatus of claim 3, wherein the quality detector determines the quality metric from a ratio of the received signal power and the ping power level.

5. The apparatus of claim 1, further comprising a controller to generate a signal at a first power level that is input to the inductor to generate the electromagnetic field and to receive a received power message that indicates received signal power in response to the first power level.

6. The apparatus of claim 5, wherein the quality detector determines the quality metric from a ratio of the received signal power and the first power level.

7. The apparatus of claim 1, wherein the indicator comprises a plurality of LEDs that are configured to indicate the quality metric, and wherein a selected number of the LEDs are enabled based on the quality metric.

8. The apparatus of claim 1, wherein the indicator comprises an LED that is configured to indicate the quality metric, and wherein a brightness level of the LED indicates the quality metric.

9. The apparatus of claim 1, wherein the indicator comprises a digital display that is configured to indicate the quality metric.

10. The apparatus of claim 1, wherein the first inductor and a second inductor on the external device form an inductive coupling, and wherein the inductive coupling comprises a coupling factor.

11. The apparatus of claim 10, wherein the coupling factor is adjusted by changing a relative position of the first inductor and the second inductor, and wherein the quality metric changes with the coupling factor.

12. The apparatus of claim 1, wherein the inductive coupling comprises a resonant inductive coupling.

13. A method, comprising:
    generating an electromagnetic field to perform a power transfer to an external device;
    determining a quality metric associated with the power transfer; and
    indicating the quality metric on an indicator that indicates multiple states, wherein one of the multiple states indicates the quality metric.

14. The method of claim 13, wherein said determining comprises determining the quality metric to indicate an efficiency of the power transfer.

15. The method of claim 13, wherein said generating comprises generating the electromagnetic field to form a ping signal at a ping power level and receiving a signal strength indicator that indicates received signal power in response to the ping signal.

16. The method of claim 15, wherein said determining comprises determining the quality metric from a ratio of the received signal power and the ping power level.

17. The method of claim 13, wherein said generating comprises generating the electromagnetic field to form a power signal at a power level and receiving a signal strength indicator that indicates received signal power in response to the power signal.

18. The method of claim 17, wherein said determining comprises determining the quality metric from a ratio of the received signal power and the power level.

19. The method of claim 13, wherein said indicating comprises displaying the quality metric utilizing a plurality of LEDs, and wherein a selected number of the LEDs are enabled for each indicator state, respectively.

20. An apparatus, comprising:
    an inductor that receives a current signal to generate an electromagnetic field during a power transfer to an external device; and
    means for determining and indicating a quality metric associated with the power transfer.

* * * * *